United States Patent [19]

Zobel et al.

[11] 4,291,065

[45] Sep. 22, 1981

[54] STALING RESISTANT BAKED FOOD PRODUCT

[75] Inventors: Henry F. Zobel, Darien; James L. Maxwell, Clarendon Hills, both of Ill.

[73] Assignee: CPC International Inc., Englewood Cliffs, N.J.

[21] Appl. No.: 53,159

[22] Filed: Jun. 29, 1979

Related U.S. Application Data

[63] Continuation of Ser. No. 892,615, Apr. 3, 1978, abandoned.

[51] Int. Cl.³ .............................................. A21D 13/00
[52] U.S. Cl. .................................... 426/549; 426/658; 426/321
[58] Field of Search ................. 426/549, 658, 19, 321, 426/331; 435/72, 95, 201, 205; 127/29, 30

[56] References Cited

U.S. PATENT DOCUMENTS

| | | | |
|---|---|---|---|
| 2,040,249 | 5/1936 | Epstein et al. | 426/19 |
| 3,170,796 | 2/1965 | Andre et al. | 426/549 |
| 3,759,714 | 9/1973 | Burkwall, Jr. | 426/549 |
| 3,788,910 | 1/1974 | Stewart et al. | 435/72 |
| 3,922,196 | 11/1975 | Leach et al. | 435/95 |
| 4,113,509 | 9/1978 | Leach et al. | 127/29 |

OTHER PUBLICATIONS

Maga, J. A., *Bread Staling*, Critical Reviews in Food Techn. 5, 1975, pp. 443-486.
Hodge, D., *A Fresh Look at Cake Staling*, Baking Ind. J. 9, 1977, pp. 14-15, 17 and 19.
Pyler, *Baking Science & Technology*, vol. 1, Published by Siebel Pub. Co., Chicago, Ill., 1974, pp. 396-398, 409-416.

*Primary Examiner*—Joseph M. Golian
*Assistant Examiner*—Elizabeth A. Hatcher
*Attorney, Agent, or Firm*—Stanley M. Parmerter

[57] ABSTRACT

The staling of sweet baked goods comprising starch, water and sweetener is reduced from conventional levels. This may be accomplished by incorporating a preservative agent sugar having high unit anti-staling activity into the sweetener and/or by increasing the total amount of sugar in the sweetener.

2 Claims, 1 Drawing Figure

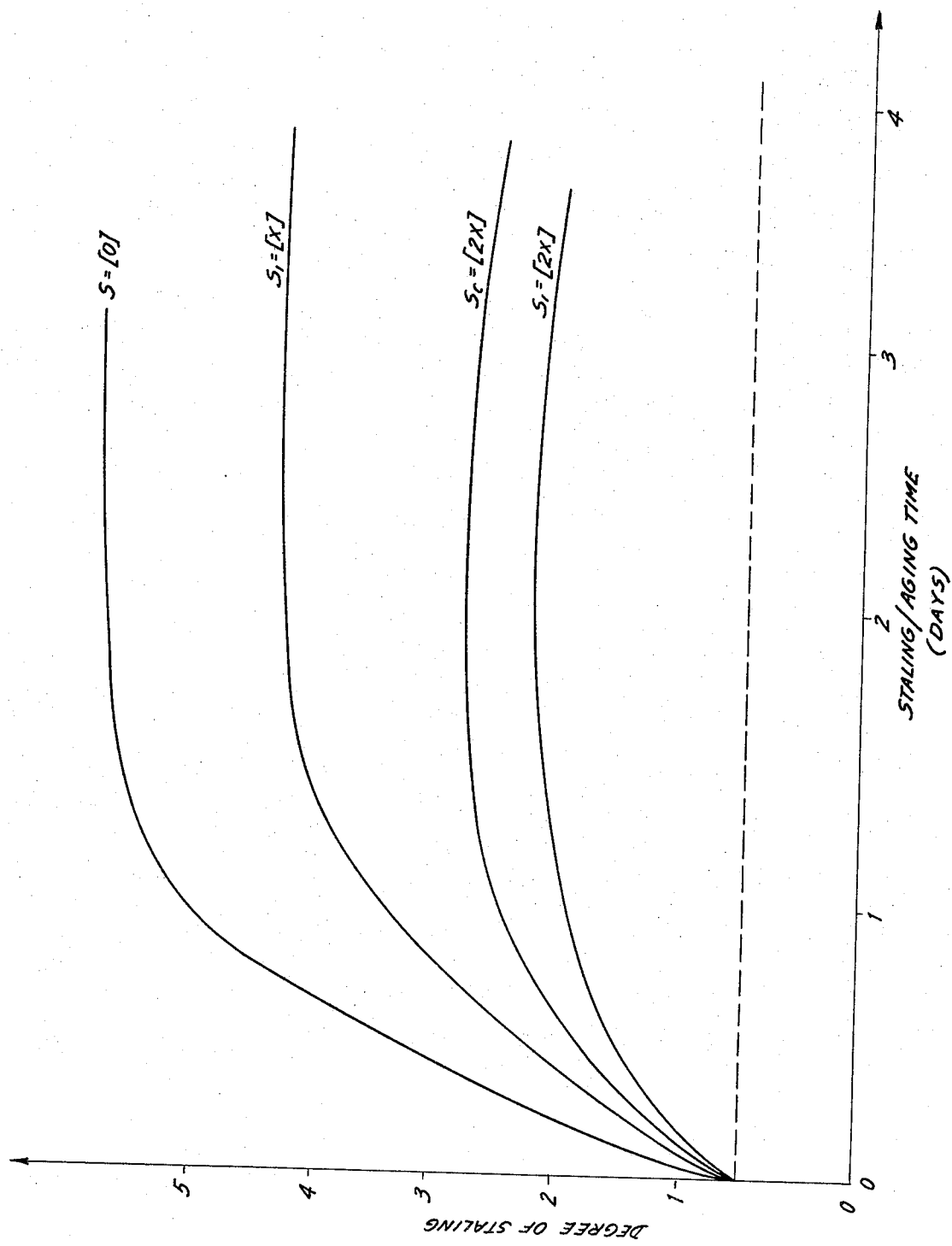

STALING RESISTANT BAKED FOOD PRODUCT

This is a continuation of copending application Ser. No. 892,615, filed Apr. 3, 1978, now abandoned.

BACKGROUND OF THE INVENTION

Sweet baked goods containing starch, water and sweetener are well known. Cakes, breakfast and snack foods, and the like are common examples which are usually formed from flour, water, sucrose and optional conventional additives.

The staling of these food products has long been a most undesirable and seemingly unavoidable phenomenon. Incident to staling, sweet baked goods undergo physical and chemical changes which dramatically reduce their consumer acceptance.

The precise nature of the staling changes is difficult to catalogue completely and precisely. Commonly, however, staling may be said to involve crumb property changes including increases in firmness, crumbliness and harshness of flavor with decreases in desired flavor and in water absorbtion capacity. In addition, crust is often transformed from a dry, crisp and brittle state to one which is soft and leathery.

Apart from the above, staling also involves certain measurable changes of state. More particularly, there may be an increase in starch crystallinity and opacity. These changes are accompanied by variation in X-ray diffraction patterns.

There have been many attempts to retard, reduce or eliminate staling of backed goods. These have included conditions of storage, such as temperature. Further, the effects of various additives have been examined. For example, at *Cereal Chem.* 54 (2) 150–160 (1977), Kim et al report that small amounts of added pentosans affect the rate of retrogradation of wheat starch gels. None of these investigations, however, has led to a completely satisfactory solution to the staling problem.

INTRODUCTION TO THE INVENTION

It has been discovered that there is a significant relationship between the sweetener composition of sweet baked goods and staling. Consequently, this invention provides a means for controlling staling through the use of certain selected sugars as at least part of that composition.

More particularly, it has been discovered that all sugars contribute significant, but different effects to the staling of sweet baked goods. It is therefore possible to reduce staling by employing a sweetener material comprising certain preservative sugars having higher anti-staling activities than the sugars heretofore utilized.

It has further been discovered that the resistance to staling imparted to sweet baked goods products by a given sugar is directly related to its concentration therein. Consequently, this invention may include the use of greater than normal amounts of any sugar in the product sweetener (preferably correspondingly less sweet sugars so as to maintain the original flavor) to reduce staling characteristics of the products.

Finally, the advantages of both of the foregoing discoveries can be combined. This may be accomplished by substitution in the subject baked goods of a sweetener composed at least partially of one or more preservative sugars and by increasing the total amount of sweetener sugar.

In accordance with this invention, the shelf-life of cooked food products containing starch and water may be substantially increased. This permits a decrease in waste or returned product. Moreover, the improved products of this invention may retain the desirable flavor characteristics to which consumers have become accustomed.

INTRODUCTION TO THE DRAWING

FIG. 1 is a graph of time versus degree of staling for exemplary baked goods food products. It depicts representative effects of different sweetener-sugars and of their concentrations.

DETAILED DESCRIPTION OF THE INVENTION

The food products of this invention need contain only starch and water in addition to sweetener material sugar or sugars. The starch and water are generally present in a bound or gel-like form as a result of baking. These essential components should be finely divided (i.e. not present in individually identifiable aggregates) and lie in essentially homogeneous dispersion in the food product.

The sweetener material of the present invention generally constitutes between about 15 and 40% of the total weight of the present baked goods products. This sweetener material is one which imbues the product with a resistance to staling superior to products heretofore known.

To achieve an increased resistance to staling, the sweetener material must exhibit a total anti-staling activity higher than that of previously utilized sweeteners. This may be accomplished through two chief means. Certain preservative agent sugars having high unit anti-staling activity may be incorporated into the sweetener material and/or the total weight amount of sugar in the sweetener material (and thus in the sweet baked goods) may be increased.

The high unit anti-staling activity sugars suitable for use as the preservative agent of the sweetener material in a sweet baked goods products are ones superior to sucrose in providing resistance to staling. These sugars—on a weight basis as compared to conventionally utilized sweeteners such as sucrose—provide a retarded rate of staling and/or a reduced degree of final staling in baked goods.

Sucrose has been selected as the sweetener control (or reference for comparison) because of its own relatively high anti-staling activity and because it is by far the most common sugar heretofore employed in making the subject class of baked food products. Sweetener compositions consisting only of sucrose are also believed to be the best anti-staling sweeteners (although not known to be such) heretofore employed in baked goods products. In addition, and because it is known that staling is highly temperature dependent, these activities are referenced to 21° C. in order to approximate common storage conditions and allow comparability.

The selection of suitable preservative agent sugars having high unit anti-staling activities may be made on a simple trial and error basis through substitution into the desired, sweet baked goods product. Measurement of the staling properties of the resultant product over a time of, for example, 3 to 10 days will then reveal the manner in which staling has been affected. These results may then readily be compared to those of an otherwise identical product which contains an equal sweetener weight of sucrose.

As an alternative selection means, model systems have been discovered which permit more rapid estimate of the unit anti-staling activities of sugars. These simple model systems allow close estimation of the unit activities or individual, or combinations of, sweetener sugars. An exemplary test model which has proven particularly useful may be utilized and analyzed as follows.

TEST MODEL SYSTEM

Right cylindrical wheat starch gels (diameter 2.3 cm, height 3.0 cm) may be made by packing an admixture of moistened starch and sweetener into aluminum molds. After heating the packed molds for 2 hours at 100° C., they may be quenched in ice water to cool the gels to 21° C., at which temperature they may be stored until they are analyzed.

For analysis, the cell halves are separated to free the gel cylinder. Rigidity measurements may then be made with an Instron Tensile Tester operating in the compression mode. Compression is desirably limited to about 10% (to avoid exceeding the elastic modulus of the gel and thus permit reuse of the gel specimen after further aging). This analysis will result in a series of data points over an aging period and reflect the progress of staling in the gel.

FIG. 1 plots representative staling curves for cylindrical gels of various sweetener concentration and composition. The curves obtained from this test model system and from actual baked goods are similar. The horizontal axis of FIG. 1 reflects arbitrary periods of aging from left to right; the vertical axis, arbitrary units of firmness.

On the graph, the highest curve (S=[0]) represents the staling of a model gel containing no sweetener material. The curve ($S_c$=[2X]) depicts a model in which the only sweetener is a sucrose control present at a concentration of 2X. The two ($S_t$) curves represent a test sweetener which is a sugar having unit anti-staling characteristics superior to those of sucrose. Where present at a concentration equal to that of the sucrose control—i.e. 2X—this sugar provides both a retarded and less staling gel. The curve ($S_1$=[X]) shows the concentration effect of a sweetener. Its reduced concentration results in staling characteristics intermediate of those of gels containing no sweetener and $S_t$ sweetener at a concentration of 2X.

In addition to depicting the differing rates of staling, FIG. 1 reveals that the sweetener materials affect the total degrees of change incident to staling. This means that a sweetener material may not only retard staling, but (as shown by the differing height of the curves measured on the vertical axis) also prevent deterioration in product properties past a given degree of staling.

Due to the fact that this model monitors aging as a function of compressibility (and conversely of firmness), the anti-staling characteristics may be converted to mathematical form by the expression:

$$E = A - Be^{(-t/T)}$$

Wherein:
E = rigidity of the gel at a given time;
A = final rigidity of the gel;
B = total change in rigidity of the gel;
T = time constant; and
t = time of aging/staling of the gel
e = Natural Constant (2.718 . . . )

For gels of a given starch-water-sweetener concentration, this equation may be resolved for comparison of different sweetener material sugars to its two key values—"A" and "T". In such instance, it has been found that the various sweetener material sugars may be ranked for unit anti-staling activity on the basis of decreasing "A" and increasing "T". Thus, for example, sugars having lower "A" and higher "T" values than sucrose will provide superior staling-resistant food products.

Preservative agent sugars which are capable of providing higher anti-staling activities in baked goods products than equal weights of sucrose most generally are oligosaccharides of from two to three hexose or pentose units. This is not, however, a complete listing and representative sugars include maltose, maltotriose, and xylose. Such sugars of high unit activity preferably constitute between 30 and 100%, most preferably 60-100%, by weight of the total sweetener material employed in the product sweet baked goods.

Of the foregoing high unit anti-staling activity sugars, maltose and maltotriose are particularly preferred. Both are relatively inexpensively produced, particularly in corn syrup compositions. Most preferably, the present baked food products contain a sweetener material composed of 30 to 100% by weight of at least one of these two sugars.

The sweetener material may also contain (in addition to preservaton agent sugars) subsidiary sugar or dietetic sweetening components. These subsidiary components need not possess high unit anti-staling activities. They may even include sucrose itself. Where such subsidiary sweetener components are present, however, the high unit anti-staling activity sugar or sugars are desirably present in sufficient proportion to compensate for the lesser anti-staling activity of the subsidiary components. This will provide a composite anti-staling activity in the ultimate baked food product which is superior to that which would be provided if the sweetener were a control consisting only of sucrose.

The unit anti-staling activities of these subsidiary sweetener components alone or the composite unit anti-staling activity of subsidiary components plus preservative agent sugars (i.e. of the entire sweetener material) may be measured or calculated as already discussed above. This makes selection of suitable total sweetener compositions simple. It also means that virtually any available sugar or sugar composition can be employed in the sweetener material of this invention.

For example, if it is desired to utilize a given low activity sugar composition (such as most corn syrup mixtures) in sweet baked goods, one need only augment the composition with sufficient high unit anti-staling activity sugar as a preservative agent to make its composite unit anti-staling activity superior to that of sucrose. This means that even those corn syrups of high dextrose or other low unit activity sugar can be made suitable for use herein.

In addition to reliance upon preservative agent sugars for improvement of the total anti-staling activity of the present baked goods products, higher concentration of any sweetener material may be employed. Because the effect of all sugars is concentration dependent, increased amounts of sugar in the present baked goods will retard and/or reduce staling. Thus, the total anti-staling effect of a given sweetener material may also be increased by providing additional sugar (whether preservative agent sugar or subsidiary sweetener component). In utilizing this means for improving resistance to staling in baked goods product, it is preferred to employ up to, about 50% most preferably from about 10 to about 30%, by weight of sweetener material as has heretofore been employed for such products.

It is preferred that the final baked goods exhibit essentially the same degree of "sweetness" to which consumers have become accustomed. It may therefore be of importance to recognize the varying degrees to which sugars are recognized as being organoleptically "sweet". Any desired degree of sweetness is, however, readily achieved. If increased amounts of sugar are employed, correspondingly or must less "sweet" sugars may be used. On the other hand, if the sweetener material is too bland, additional subsidiary and very sweet sugar sweeteners (including, for example sucrose or dextrose) and/or non-sugar sweeteners may be incorporated.

Whether used individually, or in combination for still further improvement, the foregoing means for providing resistance to staling may be utilized in improving any sweet baked goods product. After selecting a given such product, one first determines the total anti-staling activity of its sweetener. An improved product may then be baked by substituting a sweetener material of superior total anti-staling activity and that substitute material may contain preservative agent sugar, a greater total amount of sugar, or both.

The food products suitable for improvement in accordance with this invention are conventional sweet baked goods. They contain at least starch, water and sweetener in essentially homogeneous dispersion. The starch constituent normally varies from about 20 to 70%, preferably 25 to 55%, by total weight and may be provided by starch-containing materials such as flour or pure starch. Water may be present in from 15 to 40%, preferably 20 to 35%, by total weight. The sweetener material may comprise from 15 to 40%, preferably from 25 to 40% by product weight.

In addition to the three essential components of the subject food products, many optional but conventional additives may be present. These optional additives may comprise up to about 50%, preferably from 5 to 30%, by total product weight and are the common or conventional remaining ingredients of the subject food products.

Suitable examples of these optional ingredients are baking soda, shortening, egg or egg fractions, nuts, spices, preservatives and the like. Solid sweetening ingredients such as chocolate chips, icing etc. may also be present. But, not being finely and essentially homogeneously dispersed in the baked food product, this class of surface-coated and large particle sweeteners does not substantially affect the sugar imparted anti-staling effect.

Both the specific composition of these optional additives and manner of cooking of the subject products becomes clear when it is recognized that these food products are such everyday items as cakes, cookies, and the like. The optional additives and cooking conditions which differentiate these specific sweet baked goods both from each other and from starch-water-sweetener gels are well known. Any may be employed.

The following examples are illustrative of the present invention. In the examples, all proportions are provided on a total weight basis unless otherwise indicated.

EXAMPLE I

A gel aging/staling study was performed utilizing various individual sweetener sugars in the Test Model System described above. Wheat starch was utilized and the starch-water-sweetener proportions of the product gel were 1:1:1 by weight. The results are set forth in the table below.

TABLE 1

| Sweetener | Rigidity Initial | Rigidity Final (A) | Time Constant (T) in Hours |
|---|---|---|---|
| Fructose | 2.9 | 19 | 40 |
| Galactose | 2.2 | 16.7 | 38 |
| Mannose | 2.2 | 16.1 | 51 |
| Dextrose | 2.2 | 16 | 57 |
| Isomaltulose | 2.2 | 12.6 | 49 |
| Sucrose | 2.8 | 12.4 | 63 |
| Maltose | 2.5 | 8.9 | 68 |
| Xylose | 1.8 | 6.9 | 97 |
| Maltotriose | 2.7 | 11.4 | 125 |
| (None) | 2.5 | 34.3 | 64 |

The table shows that the initial rigidity of the gels is essentially constant (even in the absence of any sweetener material). All sugars showed substantial improvement in final gel rigidity (i.e. lower A values) and in the time constant (i.e., increase T values) as compared to a gel containing no sweetener. Maltotriose, maltose and xylose far outperformed the sucrose control by providing retarded staling and decreased final product staling.

EXAMPLE II

The technique of Example I was repeated using a starch-water-sweetener gel formulation of 1:1:0.2. The results were as follows:

| Sweetener | Rigidity Initial | Rigidity Final (A) | Time Constant (T) in Hours |
|---|---|---|---|
| Lactose | 2.7 | 28 | 83 |
| Cellobiose | 2.5 | 25 | 87 |
| Dextrose | 2.5 | 25 | 63 |
| Sucrose | 2.5 | 24 | 64 |
| Maltose | 2.5 | 23 | 65 |
| (None) | 2.5 | 34 | 64 |

These data (by comparison with Example I) show the decrease in anti-staling activity attributable to the sweetener sugars at lower concentration. Nonetheless, all improve significantly over gels containing no sweeteners.

EXAMPLE III

Snack cakes were baked containing various sweetener materials. The cakes were prepared from a recipe requiring:
Sweetener—32%
Flour—26% (24% starch)
Shortening—2.5%
Egg—2%
Emulsifier—1.5%
Milk Solids—1.5%
Baking Salts—1.5%
Water—33%

After baking for 10 minutes at 200° C., the cakes were analyzed for staling as described in Example I. The results of this analysis were compared with predicted characteristics calculated from the sugar compositions of the individual sweetener materials. This comparison is set forth in the table below.

OBSERVED AND PREDICTED "T" STALING VALUES

| Sugar[A] | 100% Sugar | | 75% Royal Glucose[1] 25% Sugar | |
|---|---|---|---|---|
| | Observed | Predicted | Observed | Predicted |
| Dextrose | 66 | 47 | — | — |
| Royal Glucose[1] | 62 | 49 | — | — |
| Sucrose | 74 | 63 | 75 | 52 |
| Globe Syrup[2] | — | 102 | 106 | 62 |
| Maltose Syrup[3] | 144 | 85 | — | — |

| | Dextrose | Maltose | Trisaccharide | Higher Saccharide |
|---|---|---|---|---|
| 1 | 92% | 3% | 1% | 4% |
| 2 | 18.6% | 13.4% | 11.4% | 56.6% |
| 3 | 6.1% | 70% | 4.1% | 19.8% |

[A]The listed corn sugar sweeteners had the following compositions:

The differences between observed and predicted "T" values appears relatively constant and is attributed to the optional additives present in the cakes. Despite these differences, however, the anti-staling activities of the sweetener materials is both evident and substantial. This confirms both the accuracy of estimates based on the test model gels and the importance of sugar sweeteners on staling in baked food products.

What is claimed is:

1. A staling resistant sweet baked goods food product comprising a starch, water and between 15% and 40% by weight of a maltotriose-containing sweetener composition in a solid, fine and essentially homogeneous dispersion wherein said sweetener composition comprises between 30% and 100% by weight of maltotriose.

2. The food product of claim 1, wherein the sweetener composition comprising maltotriose also comprises a sugar selected from the group consisting of sucrose, maltose, dextrose and mixtures thereof.

* * * * *